March 18, 1969     W. F. TUFTS     3,433,308
LAWN TOOL
Filed Aug. 25, 1965
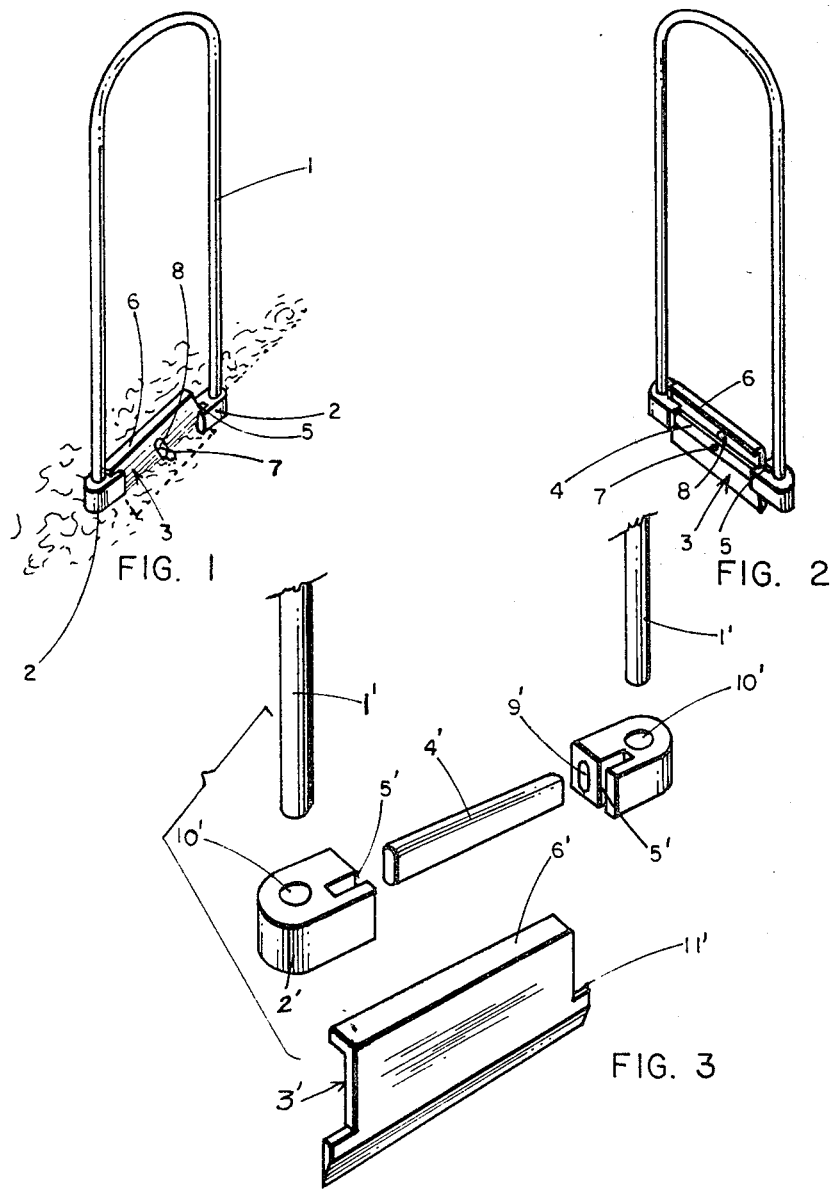
INVENTOR
William F Tufts

United States Patent Office 3,433,308
Patented Mar. 18, 1969

3,433,308
LAWN TOOL
William F. Tufts, Atlanta, Ga., assignor to C. M. Tuck & Associates, Inc., Athens, Ga., a corporation of Georgia
Filed Aug. 25, 1965, Ser. No. 483,030
U.S. Cl. 172—18                                               2 Claims
Int. Cl. A01b *45/00, 41/00*

ABSTRACT OF THE DISCLOSURE

A lawn tool having a frame carrying floating blade which can pivot in the frame and also move vertically.

---

This invention appertains to lawn tools in general and to lawn edging tools in particular. The purpose, here, is to provide an improved, floating-blade type of lawn edging tool which is both more efficient to use and more practical and economical to manufacture. An investigation of the art shows lawn edgers of numerous designs, all falling within the category of either a pivotable blade within a handle-frame, or a rigid blade-handle combination.

However, the design of this invention embodies a handle-frame-blade combination in which the blade is a free floating member. The free floating feature affords certain advantages over those of the prior art which will be pointed out in the course of this description.

In general, the figures are representative as follows:

FIGURE 1 shows the tool of this invention being employed to trim the turf of a lawn.

FIGURE 2 shows a reverse view of the tool of FIGURE 1.

FIGURE 3 shows a fragmentary exploded view of the lower portion of a modified form of the present invention, in which the pin and slot of the preceding embodiment are deleted, the blade itself being provided with protrusions for limiting upward movement of the blade assembly.

Referring now to the figures separately, the details of the invention will be described.

In FIGURE 1 the edging tool is used for the purpose of trimming the edge of a lawn. The tool comprises the handle 1, the sockets 2, the earth shearing blade 3, the cross-bar member 4, which is shown in FIGURE 2. The guide blade 3 is free to move vertically at either or both ends in the slots 5 of the sockets 2.

The flange 6 serves both as a tread and as a travel-limiting means or element preventing the blade from passing downwardly completely thru the slots. 7 is a pin, which projects through slot 8 in blade 3 and is threadedly received by cross bar member 4. Pin 7 is also a travel-limiting means and serves to limit the travel of the blade vertically.

In operation the handle-cross-bar frame serves as a stabilizing guide for the blade 3. By such means, and with the blade 3 aligned along the lawn's edge, foot pressure is then applied to the tread 6 to shear the turf. The amount of foot pressure can be substantially reduced by application first to one end and then to the other end of the tread 6.

FIGURE 2 shows the structure of FIGURE 1 from the opposite side in order that the cross-bar member 4 can be clearly shown. It is seen that the pin 7 is threadedly secured into the cross-bar member 4, and by its removal the blade can be removed from the assembly.

FIG. 3 shows a modified form of the present invention wherein the pin 7, passing through the blade 3, is eliminated. In more detail, in the modified form of the present invention, the flat blade 3' has a tread 6' disposed normal to the plane of blade 3', along the upper edge of blade 3', just as in the preceding embodiment. The lower side edges, adjacent the lower corners of blade 3', are provided with opposed outwardly projecting stops or projections 11' which are spaced from the tread 6'.

Opposed sockets 2' are provided with holes 10' which receive the ends of the U-shaped handle 1' and are also provided with opposed vertical inwardly opening slots 5' for slidably receiving quite loosely, the edges of blade 3'. The sockets 2', adjacent the vertical slots 5', have opposed aligned holes 9' which receive the ends of a straight cross bar 4'. It is thus seen that the blade 3' is secured loosely between sockets 2' of the handle-cross-bar assembly and at the same time is free floating so as to be movable in a vertical path and to be pivotable to a limited extent between the tread 6' and the projections 11' as limiting elements. It is evident that such limiting means could take other forms such as suitable projections extending from the surface of the blade.

The above description is intended to be exemplary of the general concept of this invention, and is not intended to limit the spirit thereof to the specific details described.

What I claim is:

1. A lawn tool comprising, a hand-cross-bar frame and an earth shearing blade, said frame being provided with opposed guide slots for receiving the edges of said blade, said blade being free to move vertically within said slots, and travel limiting means retaining said blade within said slots, said travel limiting means including a pair of opposed outwardly projecting protrusions on the side edges of said blade and engageable with said frame for limiting upward movement of said blade, a tread on the upper edge of said blade engageable with said frame for limiting downward movement of said blade.

2. A lawn tool comprising, a frame and an earth shearing blade carried by said frame, said frame being provided with transversely opposed slot means for receiving the edges of said blade, the width of said blade being sufficiently narrow that said blade is free to move vertically within said slot means and is also free to pivot within said slot means, and travel limiting means on said blade for limiting the pivoting of said blade and for limiting the vertical movement of said blade within said slot means, said blade being sufficiently wide that it cannot be readily removed from said slot means.

References Cited

UNITED STATES PATENTS

| | | | |
|---|---|---|---|
| 1,532,082 | 3/1925 | Schafer | 172—18 |
| 2,513,730 | 7/1950 | Little | 172—18 XR |
| 2,707,829 | 5/1955 | Fisk | 30—315 |
| 2,814,875 | 12/1957 | Seals. | |
| 3,078,927 | 2/1963 | Wetzel | 172—19 |

ABRAHAM G. STONE, *Primary Examiner.*

JAMES W. PETERSON, *Assistant Examiner.*